United States Patent
Murphy

(10) Patent No.: US 11,592,544 B2
(45) Date of Patent: Feb. 28, 2023

(54) METHODS AND DEVICES FOR ESTIMATING A COMPONENT TRANSMISSION LOSS OF RADAR SIGNAL

(71) Applicant: AXALTA COATING SYSTEMS IP CO., LLC, Wilmington, DE (US)

(72) Inventor: Neil Richard Murphy, Audubon, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 22 days.

(21) Appl. No.: 16/951,342

(22) Filed: Nov. 18, 2020

(65) Prior Publication Data

US 2022/0155430 A1   May 19, 2022

(51) Int. Cl.
*G01S 13/00* (2006.01)
*G01S 7/40* (2006.01)
*G01S 7/02* (2006.01)

(52) U.S. Cl.
CPC .......... *G01S 13/006* (2013.01); *G01S 7/4004* (2013.01); *G01S 7/027* (2021.05); *G01S 7/4039* (2021.05)

(58) Field of Classification Search
CPC ...... G01S 13/006; G01S 7/4004; G01S 7/027; G01S 7/4039
See application file for complete search history.

(56) References Cited

U.S. PATENT DOCUMENTS

| | | | |
|---|---|---|---|
| 2010/0022696 A1 | 1/2010 | Maruoka et al. | |
| 2015/0109162 A1* | 4/2015 | Binzer | G01S 13/931 427/402 |
| 2021/0040329 A1* | 2/2021 | Decker | C09D 7/61 |
| 2021/0132217 A1* | 5/2021 | Schwenkert | H01Q 1/3283 |
| 2021/0210846 A1* | 7/2021 | Sekiguchi | H01Q 1/422 |
| 2022/0013885 A1* | 1/2022 | Yang | H01Q 1/525 |

FOREIGN PATENT DOCUMENTS

| | | | | |
|---|---|---|---|---|
| DE | 102009029763 A1 | 12/2010 | | |
| JP | 2009102626 A | * 5/2009 | | C08J 7/047 |
| JP | 2009102626 A | 5/2009 | | |
| WO | WO-2020208134 A1 | * 10/2020 | | C09C 1/0015 |

\* cited by examiner

*Primary Examiner* — Peter M Bythrow
*Assistant Examiner* — Nazra Nur Waheed
(74) *Attorney, Agent, or Firm* — Lorenz & Kopf, LLP

(57) ABSTRACT

Methods and devices for estimating a component transmission loss are provided. In an exemplary embodiment, a method includes receiving a desired substrate criterion of a desired substrate, and receiving a desired coating criterion of a desired coating. A component includes the desired substrate and the desired coating. A coating criterion value is received, where the coating criterion value quantifies the desired coating criterion. A desired coating permittivity is estimated for the desired coating, using the coating criterion value, and an estimated component transmission loss of radar signal through the component is produced.

17 Claims, 6 Drawing Sheets

METHODS AND DEVICES FOR ESTIMATING A COMPONENT TRANSMISSION LOSS OF RADAR SIGNAL

TECHNICAL FIELD

The technical field relates to methods and devices for estimating radar signal transmission and more particularly relates to methods and devices for estimating transmission loss of radar signal through a component.

BACKGROUND

Radar is used in motor vehicles to detect objects for a variety of purposes, such as autonomous driving and automatic braking. The radar is typically mounted behind a component of the motor vehicle, typically a bumper or vehicle panel, so the component covers the radar device. In this regard, the radar signal must penetrate the bumper when traveling to an object to be detected, and then penetrate the bumper again when reflected off of the object and returning to the vehicle. The bumper, including any coatings applied to the surface of the bumper, can transmit, reflect, or absorb radar. Any reflection or absorption of the radar signal limits the effective detection range of the radar. For the radar to be useful for automatic braking, the effective range of the radar must be at least as far as the braking distance of the vehicle at the driving speed.

If the component, e.g., the bumper or vehicle panel, behind which the radar is mounted is metal, the effective range of the radar is zero, so the components utilized are typically plastic or other non-metallic materials. The component includes the substrate, but also typically includes a coating overlying the substrate. Motor vehicle coatings typically include a basecoat, and often also include a primer coat and/or a clearcoat, with an interface between each layer. The radar typically used in motor vehicles for detecting objects is 77 giga hertz (GHz) brand radar, which describes a category of radar that includes frequencies from about 76 to 81 GHz.

The frequency band of about 76-81 GHz corresponds to a wavelength range of about 3.70 to about 3.94 mm. The radar waves are roughly on the same length scale as the bumper or panel that covers the radar device, so the radar signal travelling through the coated bumper or panel cover is subject to a phenomenon known as interference. Interference affects signal transmission due to the interactions of reflected signals that occur at the front and rear sides of the bumper cover. The reflected waves from the two surfaces can interact constructively, increasing the reflection, or destructively, subsequently decreasing the reflection. Signal transmission can be improved by tuning the bumper and coating thickness to achieve destructive interference.

The transmission of a radar signal through a typical bumper substrate and the coating layers thereon can be significantly changed by minor variations, where a reduction of reflection and absorption results in an increase in transmission (i.e., lower transmission losses). The type of material in the substrate, the type of coating layers, the components in the coating layers, and the thickness of the coating layers all influence the transmission. It is possible to optimize the substrate and coating layers to reduce the effects of reflection losses due to constructive interference. Calculation of the reflection and transmission of a multilayer system can be performed if the complex permittivity properties and thickness values are known for all constituent layers.

Accordingly, it is desirable to develop methods and devices to accurately estimate the transmission of a substrate and coatings to a radar signal. Furthermore, it is desirable to develop methods and devices to recommend modifications to selected substrate and coating combinations that result in decreased transmission losses, and to estimate the transmission losses for those modifications. Furthermore, other desirable features and characteristics will become apparent from the subsequent detailed description and the appended claims, taken in conjunction with the accompanying drawings and the foregoing technical field and background.

SUMMARY

Methods and devices for estimating a component transmission loss are provided. In an exemplary embodiment, a method includes receiving a desired substrate criterion of a desired substrate, and receiving a desired coating criterion of a desired coating. A component includes the desired substrate and the desired coating. A coating criterion value is received, where the coating criterion value quantifies the desired coating criterion. A desired coating permittivity is estimated for the desired coating, using the coating criterion value, and an estimated component transmission loss of radar signal through the component is produced.

A method for estimating a component transmission loss is provided in another embodiment. The method includes receiving a desired substrate criterion of a desired substrate, a desired coating criterion of a desired coating, and a coating criterion value that quantifies the desired coating criterion. A motor vehicle component includes the desired substrate and the desired coating. A desired coating permittivity for the desired coating is estimated with the coating criterion value, and an estimated component transmission of radar signal through the component is determined. It is then determined if the estimated component transmission loss is less than a maximum component transmission loss. A recommended criterion is suggested if the estimated component transmission loss is greater than the maximum component transmission loss, where the recommended criterion reduces the estimated component transmission loss to less than the maximum component transmission loss, and where the recommended criterion is a substrate criterion, a coating criterion, or both.

A device for estimating a component transmission loss is provided in yet another embodiment. The device includes a computer readable medium embodying a computer program. The computer program is configured to receive a desired substrate criterion of a desired substrate, and receive a desired coating criterion of a desired coating, where a component includes the desired substrate and the desired coating. A coating criterion value is received, where the coating criterion value quantifies the desired coating criterion. A desired coating permittivity for the desired coating is estimated with the coating criterion value, and an estimated component transmission loss of radar signal through the component is produced.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

A vehicle "component," as used herein, includes a plastic or polymeric substrate with an overlying coating. The term "overlying," as used herein, means the overlying material may be physically touching the underlying substrate, or the overlying material may be physically separated from the underlying substrate by an intervening material, such as an overlying clearcoat that may be separated from an underlying substrate by a basecoat. It is understood that a component may be rotated or moved, so reference to one component overlying another refers to the orientation in the FIGS., with the understanding that the actual component may be rotated into a different orientation. The term "vehicle," as used herein, refers to a motor vehicle, such as a car, truck, airplane, or other device propelled through space with a motor or engine. The term vehicle includes vehicles propelled by a motor burning fuel for power, and a vehicle propelled by an engine using electricity. The overlying coating of the component includes one or more of a primer, a basecoat, and a clearcoat.

Techniques for estimating a transmission loss of radar signal through a theoretical component are described, where the transmission losses can be estimated without the need to actually manufacture the component and test it. As such, the composition of the component can be varied to provide a design that limits the transmission loss to a less than or equal to a maximum transmission loss, and then a physical version of the component may be produced. It has been discovered that many factors influence the transmission loss of radar signal through a component in unexpected ways. For example, in some cases the transmission loss can be reduced by producing thicker layers of the substrate and/or one or more of the layers of the coating. Also, changes to the pigment loading in the coating may have a significant influence, where some pigments have a much greater influence on the transmission loss than others. Other components of the coating may also influence the transmission loss. For example, adhesion promotors in the primer layer may influence the transmission loss, where different concentrations and different types of adhesion promotors have different levels of influence.

Figure 1:
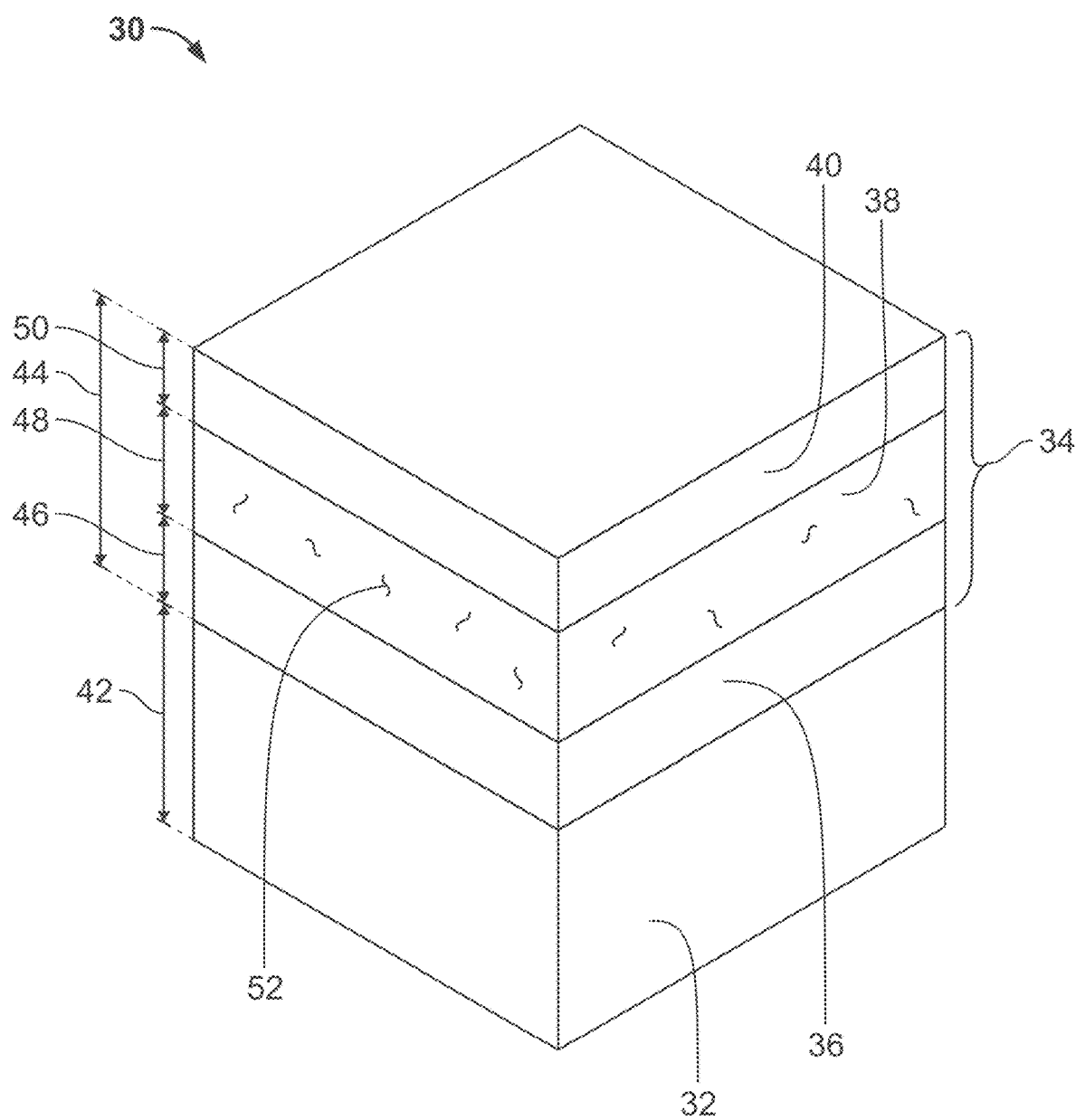
FIG. 1 is a perspective sectional view of an embodiment of a component.

Referring to FIG. 1, an exemplary desired component 30 is shown. The desired component 30 may not be tangible, because it is only theoretical, but the illustration simplifies the understanding of the desired component 30. Furthermore, the desired component 30 may be physically produced in some embodiments, so all the features of the desired component 30 may be duplicated in a real, tangible component. The desired component 30 includes a desired substrate 32 and a desired coating 34, where the desired coating 34 includes one or more of a desired primer 36, a desired basecoat 38, and a desired clearcoat 40. The desired substrate 32 and desired coating 34 have several criteria that represent physical aspects of the desired substrate 32 and desired coating 34, and these criteria are referred to herein as "desired" criteria when used to describe the desired substrate 32 and/or the desired coating 34. The desired substrate 32 has some desired substrate criteria, such as a desired substrate material, a desired substrate thickness 42, and optionally other possibilities such one or more desired substrate additives, or a desired shape. For example, the desired substrate material may be polypropylene, polycarbonate, a mixture of polycarbonate and ABS plastic with a specified concentration of polycarbonate and ABS plastic, fiberglass with a specified type of resin, carbon fiber with a specified type of resin, polyethylene, layered polypropylene and polyethylene with specified thicknesses for each layer, homogeneous and heterogeneous polymer mineral mixtures and composites, etc.

The desired coating 34 includes several possible desired coating criteria. For example, a desired coating thickness 44 is a sum of a desired primer thickness 46, a desired basecoat thickness 48, and a desired clearcoat thickness 50. Any of the desired primer, basecoat, or clearcoat 36, 38, 40 may be applied with one, two, or more layers, each. For example, if the desired clearcoat 36 is applied in two layers, the combined two layers may be considered the desired clearcoat 36. Other optional coating layers may also be present in some embodiments, such as a sealer, surfacer, adhesion promotor, midcoat, etc. The desired basecoat 38 includes a desired pigment 52, which is illustrated in FIG. 1 as effect pigment flakes. There may be more than one desired pigment 52 in some embodiments, such as effect pigment flakes, interference flakes, colored pigments, etc. Furthermore, the desired pigment 52 may be further described with additional, optional desired coating criteria, such as effect pigment flakes that are colored, effect pigment flakes with varying aspect ratios, effect pigment flakes with physical vapor deposited coatings, thin-milled flakes, achromic and chromatic micas and glass flakes, etc.

Other variations on the desired coating criteria include the optional presence of an adhesion promotor in the primer and/or the basecoat, the type of adhesion promotor, the concentration of the adhesion promotor, etc. Various conductive additives may also be included in one or more of the desired primer, basecoat, and clearcoat 36, 38, 40 as a coating criterion, where the conductive additive may be present at varying concentrations. Another potential desired coating criterion includes the type of resin in one or more of the desired primer, basecoat, and clearcoat 36, 38, 30, such as acrylic resin, epoxy resin, polyurethane resin, etc. The number of variables potentially influencing the transmission loss of the desired component 30 is large. The transmission loss in the FIGS. is shown as a negative decibels value, where a value of 0 decibels indicates no transmission loss. Therefore, the further a value is from 0, the greater the transmission loss, where greater transmission loss indicates reduced radar power penetrating the desired component 30.

Figure 2:
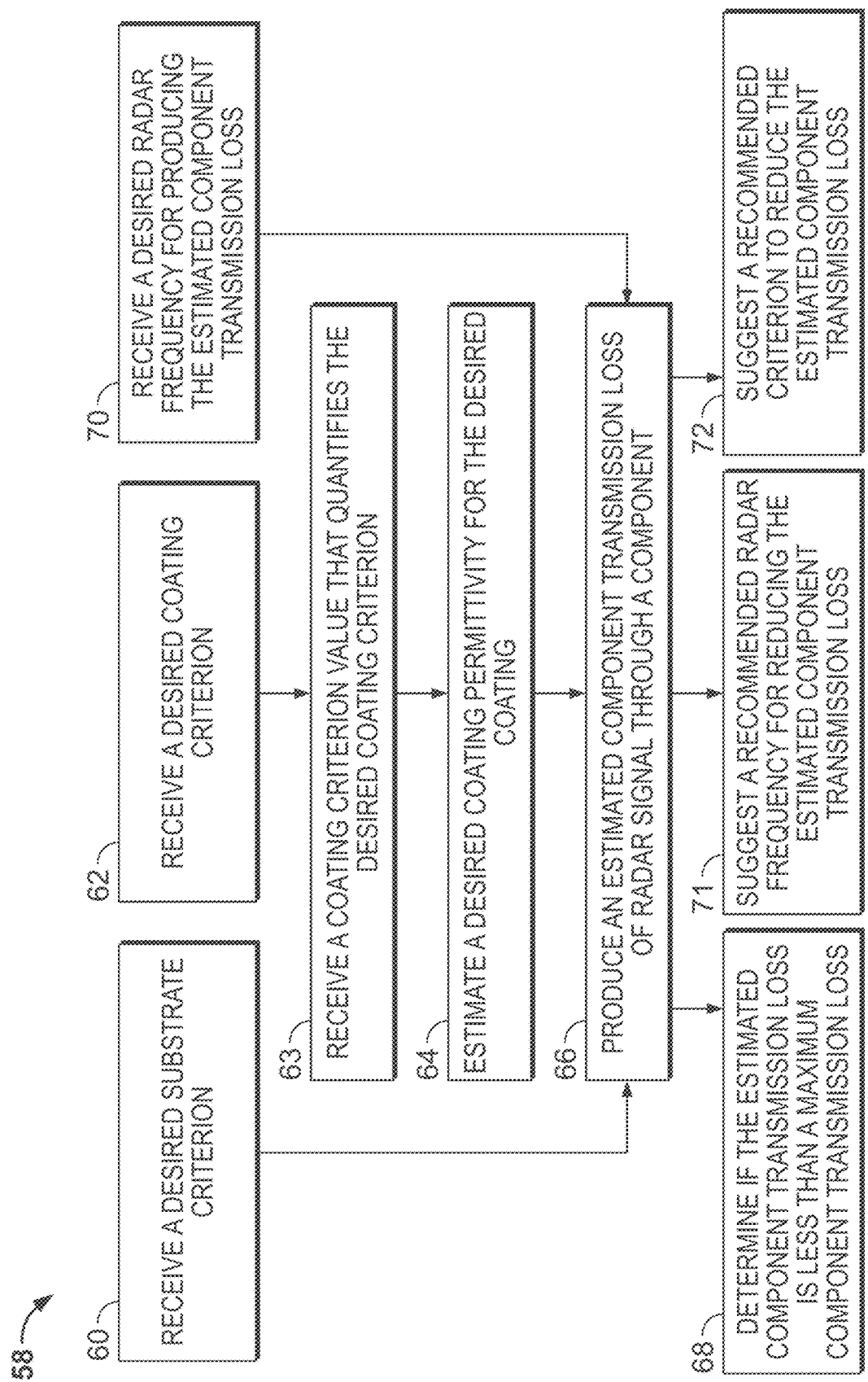
FIG. 2 is a flow chart a method for determining an estimated component transmission loss of radar signal, according to an exemplary embodiment.

A method 58 of estimating a component transmission loss of radar signal is illustrated in FIG. 2, with continuing reference to FIG. 1. The method includes the steps of receiving a desired substrate criterion 60, and receiving a desired coating criterion 62. In an exemplary embodiment, a user selects the various criterion, and a computer receives the selected items. The desired substrate criterion may include more than one desired substrate criterion. For example, the step of receiving a desired substrate criterion 60 may include receiving a multi-layer desired substrate 32 where the composition and thickness of each layer is received. Alternatively, the composition and a percent of the total thickness of each layer may be received. In another embodiment, a composition may be received without the associated desired substrate thickness 42. A default desired substrate criterion may also be provided, such that when a desired substrate criterion is not received, a default selection of the desired substrate criterion is provided, such as the substrate composition is polypropylene in an exemplary embodiment. Other default criteria may be utilized in alternate embodiments.

The step of receiving a desired coating criterion 62 may include receiving one or several desired coating criterion. For example, the thickness of each layer may be received, where the thickness of a layer that is not received may default to a value of zero (0). Also, the desired pigment(s) 52 may be received, and a user may provide the desired pigment(s) 52 and the desired basecoat thickness 48 with considerations such as how well the desired basecoat 38 will hide the underlying layers. The desired primer, basecoat, and clearcoat thickness 44, 46, 48 may be thickness when the respective layers are dried, but a wet layer thickness could be used in alternate embodiments. A computer program or other device may request information from a user, so that the user provides the information that is received by the computer.

Once the desired coating criterion is received 62, a coating criterion value is received that quantifies the desired coating criterion 63. The desired substrate criterion may also be quantified in some embodiments, but in alternate embodiments the desired substrate criterion may not be quantified. The coating criterion value is a quantification of the desired coating criterion with a measurable value. For example, the coating criterion value may be the desired basecoat thickness 48, which can be measured to provide a specific coating criterion value. In an alternate embodiment, the coating criterion value may be a concentration, such as the concentration of the desired pigment 52 in the desired basecoat 40. A selection of a type of resin, such as an acrylic resin, is not quantifiable. However, the concentration of that resin in a dried coating layer can be quantified. A user may provide the coating criterion value. Also, receiving the coating criterion value to quantify the desired coating criterion 63 may include receiving more than one coating criterion value for more than one desired coating criterion.

Once the desired coating criterion is received, and the desired coating criterion is quantified with a coating criteria value, a desired coating permittivity is estimated for the desired coating 64. In an exemplary embodiment, a computer estimates the permittivity, where the coating criteria value is an input into the estimation. Models may be made for each desired coating criterion, based on actual testing data for physical samples, and a computer may use the models to estimate the desired coating permittivity.

For example, for each potential desired coating criterion, a plurality of physical samples with a plurality of known criteria values may be produced for each desired coating criterion, where the plurality of known criteria values are varied and all other coating parameters are held constant. A known coating permittivity can then be physically measured for each sample, and a mathematical model or other estimation technique may be produced that relates the plurality of known coating permittivities to the plurality of different known criteria values for the desired coating criterion. Then, a desired coating criterion value can be entered into the mathematical model to estimate a desired coating permittivity. The influence of each potential desired coating criteria can be weighted and combined to give a technique for estimating the desired coating permittivity for the desired coating 64 using a combination of a plurality of different desired coating criteria and a plurality of different coating criteria values. The weighting or other techniques for combining the influence of different desired coating criteria can be determined experimentally using representative examples, and a mathematical model may be produced that includes the influence of different desired coating permittivities on the estimated desired coating permittivity. This testing can then be included in the mathematical models for estimating the desired coating permittivity of the desired coating 64. The same process may be used for a desired coating loss tangent of the desired coating. The desired coating loss tangent may be determined with the desired coating permittivity, and in this description the estimation and use of the desired coating loss tangent, and the loss tangent for other layers, is not specifically described but is included with discussions of the permittivity or transmission loss described herein.

Figure 3:
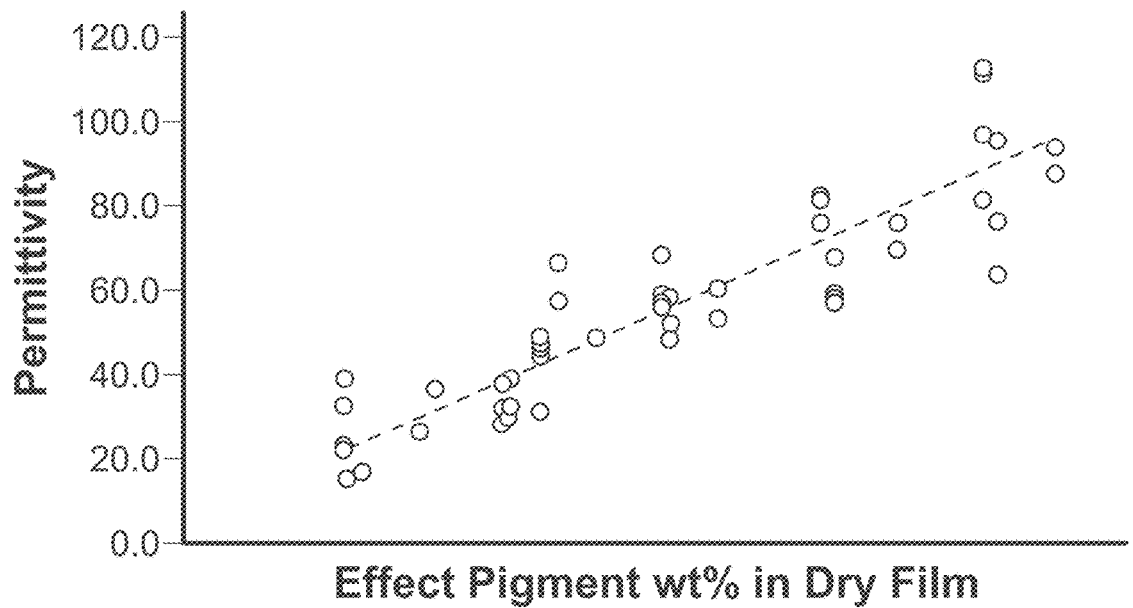
FIG. 3 is an exemplary graph of the weight percent of an exemplary effect pigment in a dry coating film vs. the permittivity of that dry coating film.

Referring to an exemplary embodiment illustrated in FIG. 3, the weight percent of effect pigment flakes in a dry basecoat was physically produced and tested for permittivity, where the basecoat thickness, resin, and other factors were kept constant. It has been discovered that the presence of metal containing effect pigment flakes in the basecoat has a greater influence on the permittivity than many other possible desired coating criteria, such as the type of resin used in any layer, the presence of other types of pigments, or the presence of a clearcoat. The points in FIG. 3 illustrate individual concentrations of effect pigment flakes in a dry film, where each measured concentration of effect pigment flakes is one of the plurality of different coating criterion values. The permittivity of the dry film was then measured for each concentration of effect pigment flakes in the dry film.

A graph of the coating permittivity vs. the concentration of effect pigment flake in the basecoat was produced, and is illustrated in FIG. 3. This graph may aid in estimating the desired coating permittivity for the desired coating 64. In one embodiment, a mathematical model of the permittivity vs. the concentration of effect pigment flakes is produced, where the dotted line in FIG. 3 illustrates one example of a linear mathematical model. This mathematical model may then be used to estimate the permittivity of the desired basecoat 38, and this permittivity may be included in an estimate of the permittivity (or transmission loss) of the desired component 30. Other types of mathematical models may be utilized in alternate embodiments, such as exponential models. The type of mathematical model used may vary from one desired coating criterion to the next, where the known values that are experimentally determined may serve as a guide for the technique used to estimate the desired coating permittivity. Some coating criteria may have little influence on the estimated component transmission loss, so default values may be utilized. For example, for some types of resin, the desired clearcoat thickness 50 has little influence on the estimated component transmission loss.

Alternatively, the graph may be used directly for estimating the desired coating permittivity for the desired coating 64, such as interpolating the permittivity for the desired basecoat 38 from the values plotted in the graph on FIG. 3. In this exemplary embodiment, the concentration of the effect pigment flakes in the basecoat is the known coating criterion value, and this known coating criterion value is located along the "Y" axis of the graph in FIG. 3. The permittivity of the desired basecoat 38 may be estimated by using a weighted average of the measured known coating permittivities of the samples having an effect pigment flake concentration slightly greater and slightly less than that of the desired basecoat 38. The interpolation may be performed mathematically in some embodiments.

Referring back to FIG. 2, with continuing reference to FIG. 1, an estimated component transmission loss of radar signal through the desired component is produced 66 utilizing the desired substrate criterion that was received and the estimated desired coating permittivity for the desired coating 64. Different techniques may be utilized for determining the estimated component transmission loss of radar signal through the desired component 66 in various embodiments. For example, the general transfer matrix method may be used in one embodiment, the ray transfer matrix analysis may be used in another embodiment, and the transmission line method may be used in yet another embodiment. Alternate techniques may also be used in alternate embodiments. This analysis is described in many references, and the calculations are understood by those skilled in the art. However, all models require a permittivity value for each layer. Therefore, the estimation of the desired coating permittivity for the desired coating 64 is an important component in the determination of the estimated component transmission loss of radar signal through the desired component 66.

In an exemplary embodiment, a maximum component transmission loss is provided, where the maximum component transmission loss is the transmission loss that still permits the radar to detect an object at a distance greater than a stopping distance of the vehicle. Of course, the maximum component transmission loss may be calculated in different manners in alternate embodiments. For example, a maximum component transmission loss may be the transmission loss that still permits the detection of an object within the maximum braking distance experienced during inclement weather conditions. The maximum component transmission loss may serve different purposes in different embodiments. Once the estimated component transmission loss is determined, it may be compared to the maximum component transmission loss to determine if the estimated component transmission loss is less than the maximum component transmission loss 68. This is a simple matter of determining which number is smaller, the estimated component transmission loss or the maximum component transmission loss.

Figure 4:
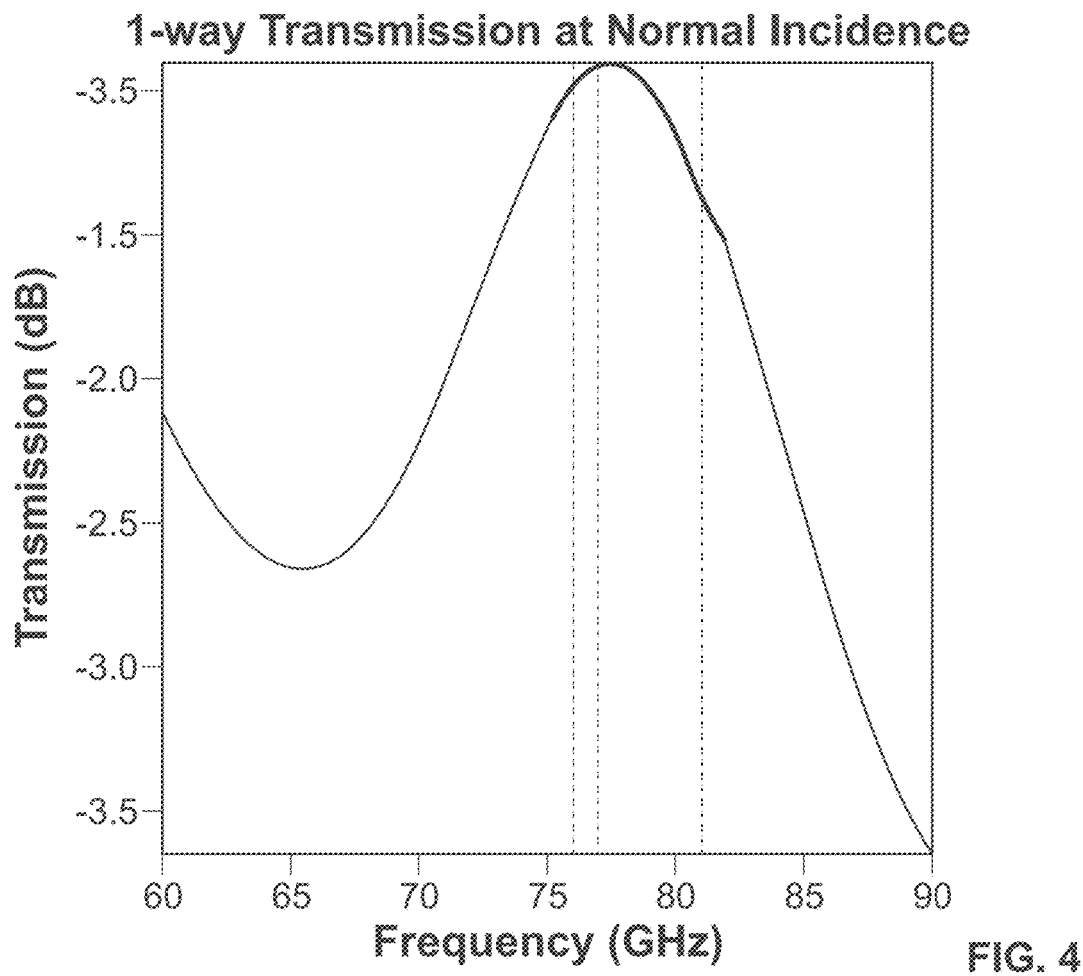
FIG. 4 is a graph of the transmission loss of radar signal of an exemplary component plotted against a radar signal frequency.

The estimated component transmission loss varies with different radar frequencies. The radar typically used in motor vehicles for detecting objects has a frequency ranging from about 76 to about 81 giga hertz (GHz), and radars of this frequency are sometimes referred to as "77 GHz" radar. The term "77 GHz radar" does seem to indicate radar at a frequency of 77 GHz, but in the industry the term "77 GHz radar" is understood to refer to radar having a frequency ranging from about 76 to about 81 GHz. In this disclosure, reference to "77 GHz brand radar" will refer to radar with frequencies ranging from 76 to 81 GHz, and reference to "77 GHz radar", without the word "brand," will refer to radar at about 77 GHz. The frequency of 77 GHz brand radar can influence the transmission loss, as illustrated in FIG. 4. FIG. 4 illustrates the transmission loss of radar signal for one exemplary desired component 30 over a range of radar frequencies, where the lowest transmission loss is at a radar frequency of about 77 to 78 GHz. Referring to FIG. 2, in some embodiments, the method 58 of estimating a component transmission loss optionally includes the step of receiving a desired radar frequency for producing the estimated component transmission loss 70. However, in some embodiments, a default radar frequency is used. In yet another embodiment, a recommended radar frequency is suggested to reduce the estimated component transmission loss 71.

Referring still to FIG. 2, with continued reference to FIGS. 1, 3, and 4, another optional step is illustrated. The method 58 includes the steps 60, 62, 63, 64, and 66 described above, but the method may then suggest a recommended criterion to produce a reduced estimated component transmission loss 72. Optional step 72 may be in place of step 68 and step 71, or in addition to them. The method 58 includes one or more of steps 68, 71, and 72. The recommended criterion is a substrate criterion, a coating criterion, or both. For example, the method 58 may suggest a change in the desired substrate thickness 42, or a change in the desired basecoat thickness 48, or a change in the desired radar frequency (as specifically mentioned above), or a change in the desired basecoat pigment loading, or even a combination of the above. The recommended criterion is one or more of the potential substrate criteria and/or the potential coating criteria, where the recommended criterion may or may not be the desired substrate criterion or the desired coating criterion originally received. This provides an alternate method to provide an estimated component transmission loss of radar signal, and aids in the development and design of a vehicle component with reduced component transmission loss. In an exemplary embodiment, the suggestion of a recommended criterion is made if the estimated component transmission loss is greater than the maximum component transmission loss, and the recommended criterion reduces the estimated component transmission loss to a value less than the maximum component transmission loss.

Figure 5:
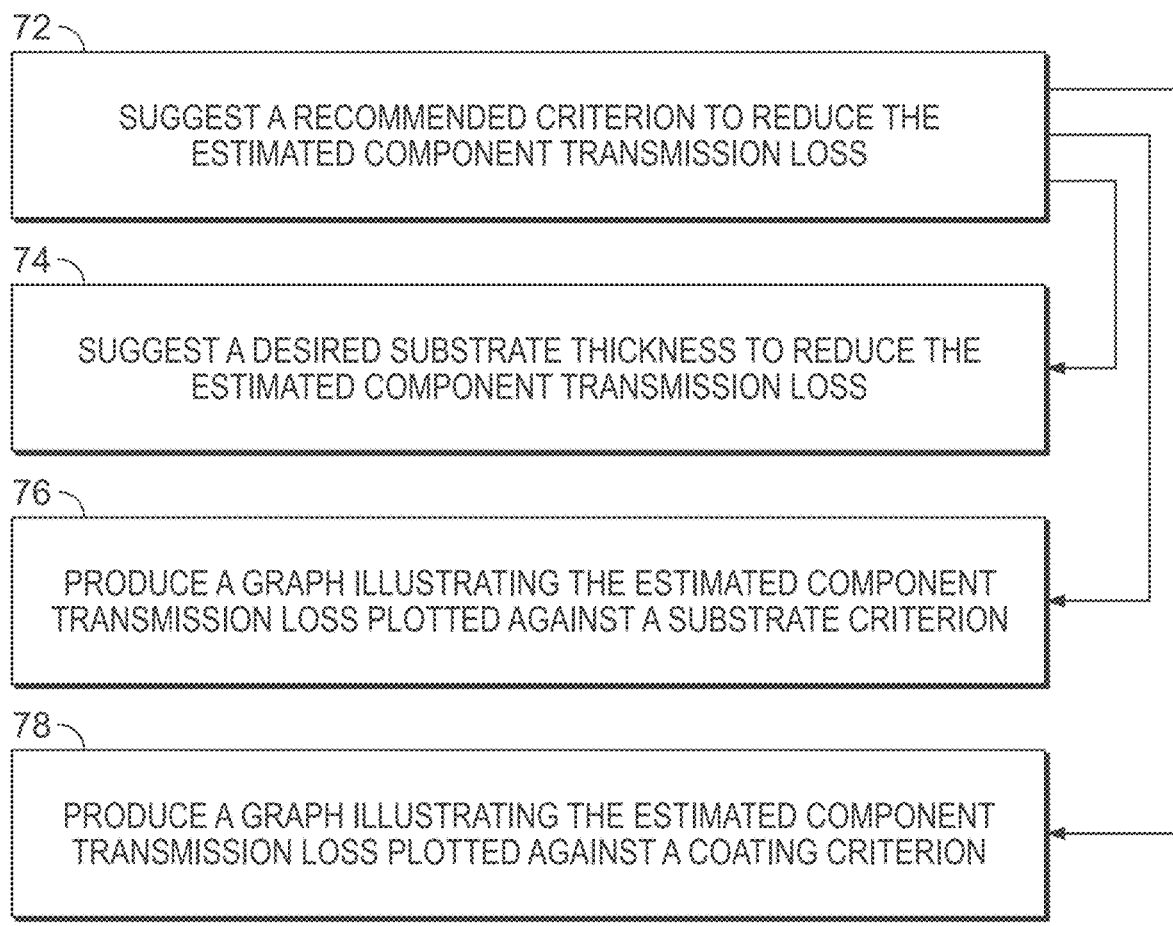
FIG. 5 is a flow chart of a step of the method of FIG. 2, in accordance with an exemplary embodiment.
Figure 6:
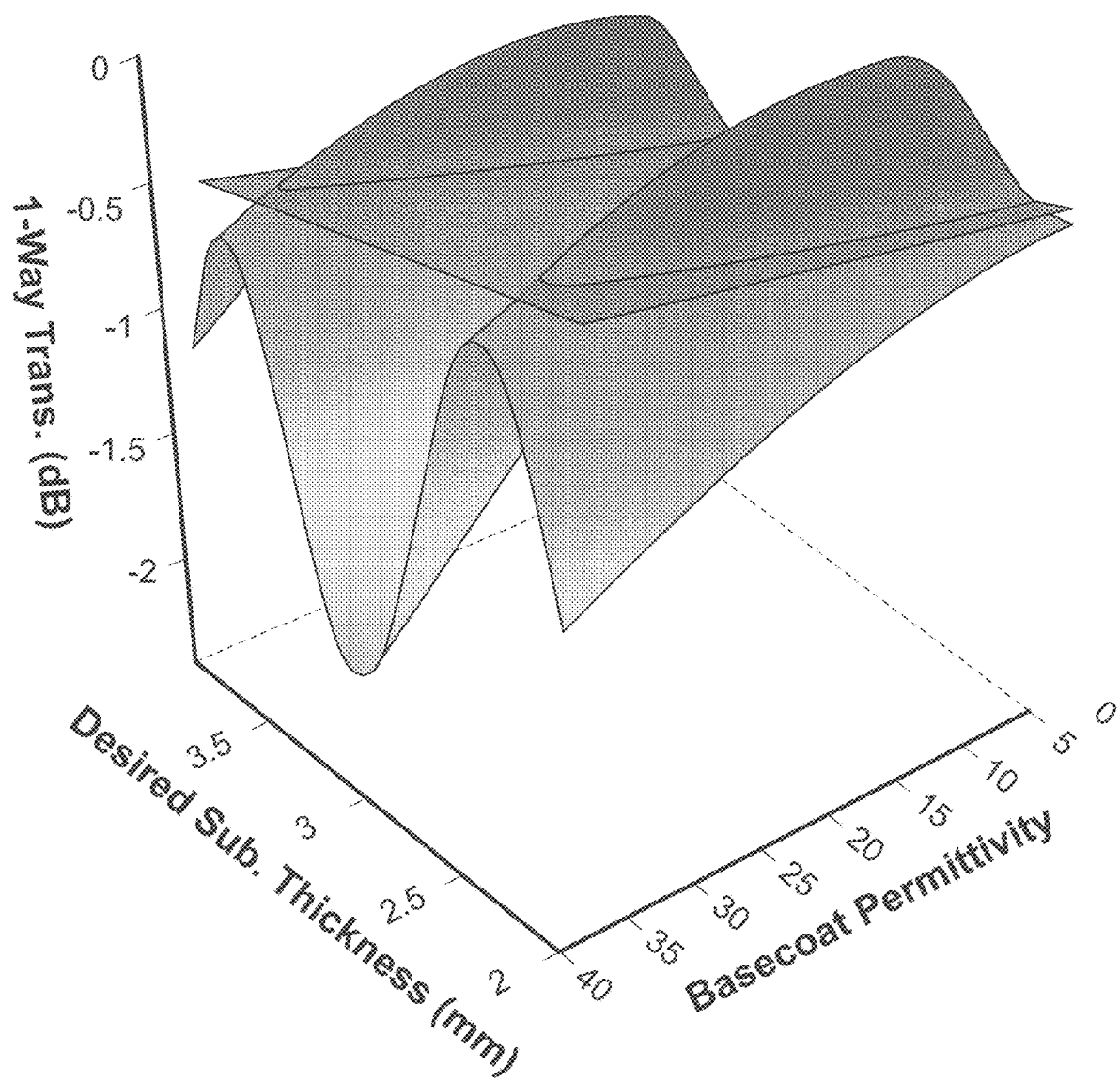
FIG. 6 is a three-dimensional graph of the transmission loss plotted against a desired substrate thickness and a basecoat permittivity.

Some examples of suggesting a change in a recommended criterion to produce a reduced estimated component transmission loss 72 are illustrated in FIG. 5, with continuing reference to FIGS. 1-4. Step 72 may include suggesting a desired substrate thickness to reduce the desired component transmission loss 74. Alternatively, or in addition, step 72 may include producing a graph illustrating the estimated component transmission loss against a substrate criterion 76. Still another embodiment of step 72 includes producing a graph illustrating the estimated component transmission loss against a coating criterion 78. Combinations of different charts, graphs, or suggestions are also possible in some embodiments. The graph(s) described above may be a typical two-dimensional graph, but in some embodiments the graph may be a three-dimensional graph, as illustrate in FIG. 6. The flat plane in FIG. 6 at a transmission loss of about −0.5 decibels represents an example of the maximum component transmission loss, and this may or may not be present in the graphs described above. The curve illustrated in FIG. 6 illustrates how increases in the desired substrate thickness 42 can actually reduce the desired component transmission loss, where the estimated component transmission loss has minimum values at a desired substrate thickness of about 2.3 millimeters (mm), and about 3.6 mm, but the estimated component transmission loss is much higher at about 3 mm.

Step 72 may alternatively suggest a recommended criterion, and this may be done without the use of the graphs described above. The graphs described above, and the exemplary embodiment in FIG. 6, are one technique of suggesting a recommended criterion to reduce the transmission loss of a desired component 72, but other techniques of suggesting a recommended criterion may also be utilized. For example, the suggestion of a recommended criterion may be a simple textual or audible suggestion. In some embodiments, the suggestion of a recommended criterion may include a suggestion of more than one recommended criterion, such as a recommended desired substrate thickness 42 to an optimal level and a recommended desired basecoat thickness 48. A wide variety of suggestions for various recommended criteria may be employed in various embodiments, including suggestions of more than one recommended criterion at a time, either with or without a graph.

The design of an actual component may be based on the various desired criteria described herein, so the desired coating criterion and the desired substrate criterion may be implemented into an actual coating criterion and an actual substrate criterion. The methods described above allow the design of an actual component with a low transmission loss of radar signal.

Figure 7:
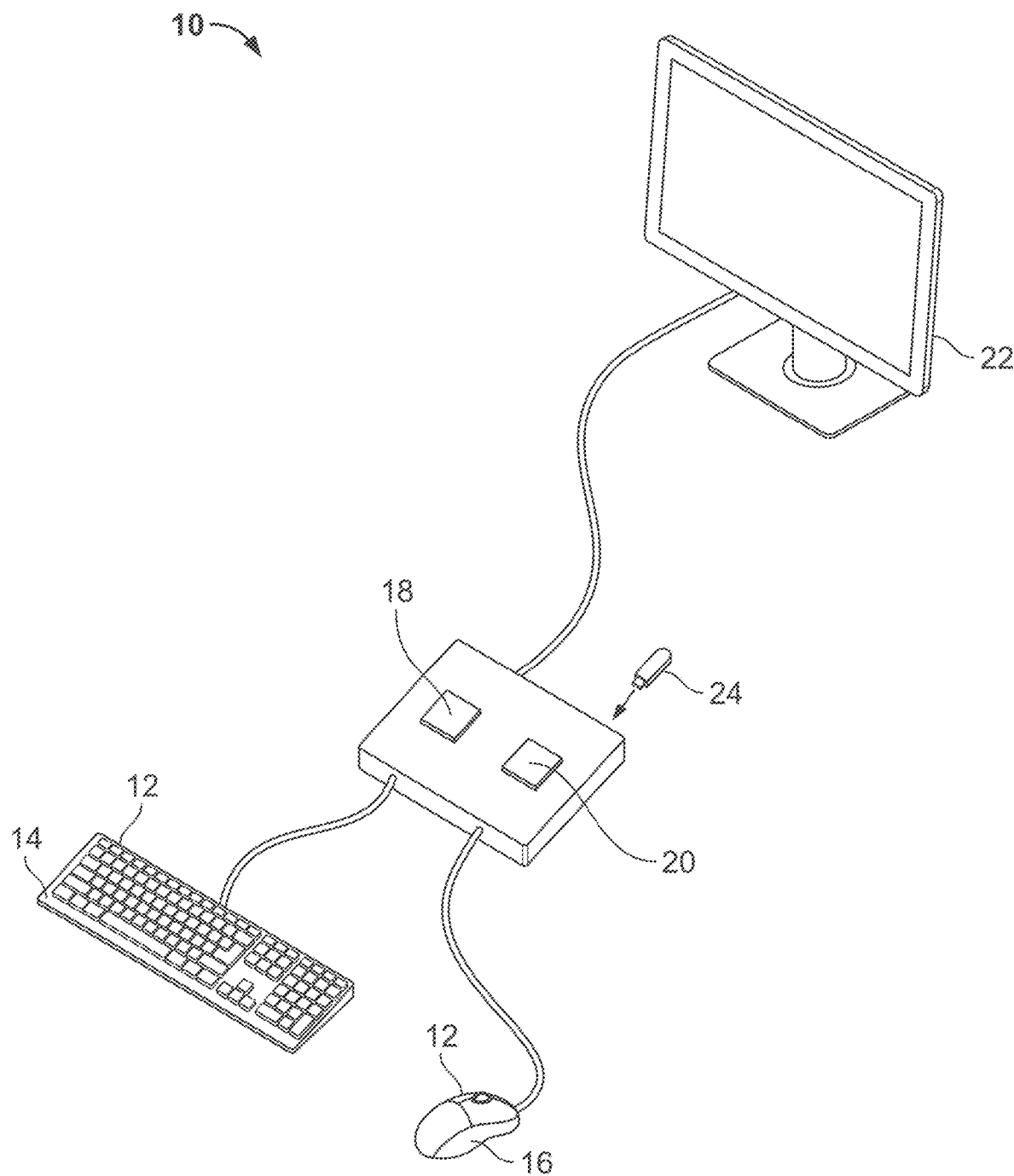
FIG. 7 is a schematic diagram of a computer that may be used to implement the method of estimating a component transmission loss of radar signal, in accordance with an exemplary embodiment.

Referring to FIG. 7, a computer 10 may be used as a device to implement the techniques and methods described herein. The computer 10 may include an input device 12, such as a keyboard 14, a mouse 16, electronic communication devices such as a modem, or a variety of other communication devices. The input device 12 communicates with a processing unit 18 and/or a memory 20 of the computer, where the processing unit 18 and the memory 20 communicate with each other. A wide variety of processing unit 18 and memory 20 embodiments are known to those skilled in the art. The computer 10 also includes an output device 22, such as the monitor illustrated. Other exemplary embodiments of an output device 22 include a modem, a printer, or other components known to those skilled in the art. The methods and techniques described above may be implemented on the computer 10.

A computer readable medium 24 embodies a computer program, where the computer program directs the computer to implement the method and techniques described above. The computer readable medium may be an SD card, a USB storage medium, a floppy disk, a CD-ROM, a DVD, a hard drive, or other devices that are readable by a computer, and that include memory for saving the computer program. In some embodiments, the computer program may be electronically downloaded to the computer, but the downloaded computer program is saved on a tangible device somewhere.

In an exemplary embodiment, the computer program directs the computer to request input from the input device 12, wherein the requested input includes the desired substrate criterion, the desired coating criterion, and the coating criterion value that are received. The computer program directs the processing unit 18 to estimate the desired coating permittivity for the desired coating, where the processing unit 18 may access the mathematical model for estimating the desired coating permittivity from the computer program, or from other memory 20. The computer program directs the processing unit 18 to produce the estimated component transmission loss of radar signal through the desired component 66, where the processing unit may access the calculations and data for this estimation from the memory 20, or from the computer program. The computer program directs the output device 22 to present one or more of (a) the estimated component transmission loss, (b) the maximum component transmission loss, (c) the suggestion of a recommended coating criterion, a recommended substrate criterion, or both, (d) the graph illustrating the estimated component transmission loss against a substrate criterion, (e) the graph illustrating the estimated component transmission loss against a coating criterion, or other information as mentioned above.

This description has represented the loss of radar signal through a component as a transmission loss, but there are alternative ways to express the same concept. For example, reduced reflection or absorption are alternative ways of expressing the same concept, or increased permittivity. Reference has been made to radar frequency, and this can be expressed as wavelength with different values but the same concept.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of estimating a transmission loss of radar signal through a component, the method comprising the steps of:

receiving a desired substrate criterion of a desired substrate, wherein the component comprises the desired substrate and a desired coating, wherein the component is a component of a motor vehicle, and wherein the desired coating comprises coating layers selected from at least one of a group of a primer, a basecoat, a clearcoat, a sealer, a surfacer, an adhesion promotor, a midcoat, and combinations thereof;

receiving a desired coating criterion of the desired coating;

receiving a coating criterion value, wherein the coating criterion value quantifies the desired coating criterion;

measuring a plurality of known coating permittivities for the desired coating criterion at a plurality of different coating criteria values;

estimating a desired coating permittivity for the desired coating from the plurality of known coating permittivities measured at the plurality of different coating criteria values, and with the coating criterion value;

producing an estimated component transmission loss of radar signal through the component;

determining if the estimated component transmission loss of radar signal is less than a maximum component transmission loss;

suggesting a recommended criterion, wherein the recommended criterion reduces the estimated component transmission loss, and wherein the recommended criterion is selected from at least one of a group of a substrate thickness, a substrate material, a basecoat thickness, a basecoat pigment loading, a primer thickness, and a combination thereof; and plotting the estimated component transmission loss in a three-dimensional plot against the substrate criterion and the coating criterion.

2. The method of claim 1, further comprising:
producing the component with the recommended criterion.

3. The method of claim 1, further comprising:
producing the component with the recommended criterion, where the recommended criterion is selected from the group of the substrate thickness, the substrate material, and combinations thereof.

4. The method of claim 1, wherein receiving the desired coating criterion comprises receiving a type of an effect pigment flake in the basecoat, and wherein quantifying the desired coating criterion comprises selecting an effect pigment flake concentration in the basecoat.

5. The method of claim 4, wherein receiving the desired coating criterion further comprises selecting an aspect ratio of the effect pigment flake.

6. The method of claim 1, further comprising:
interpolating the desired coating permittivity for the desired coating from the plurality of known coating permittivities measured at the plurality of different coating criteria values.

7. The method of claim 1,
further comprising making a mathematical model relating the plurality of known coating permittivities to the plurality of different known criteria values for the desired coating criterion, and entering the coating criterion value into the mathematical model to estimate the desired coating permittivity.

8. The method of claim 1, wherein receiving the desired substrate criterion comprises receiving a desired substrate material.

9. The method of claim 1, wherein:
producing an estimated component transmission loss of radar signal through the component further comprises producing the estimated component transmission loss of 77 giga hertz (GHz) brand radar through the component.

10. The method of claim 1, wherein suggesting the recommended criterion further comprises suggesting a desired substrate thickness that reduces the estimated component transmission loss.

11. The method of claim 1, wherein suggesting the recommended criterion further comprises:
producing a graph illustrating the estimated component transmission loss plotted against the substrate criterion.

12. The method of claim 1, wherein suggesting the recommended criterion further comprises:
producing a graph illustrating the estimated component transmission loss plotted against the coating criterion.

13. The method of claim 1, further comprises:
suggesting a recommended radar frequency for reducing the estimated component transmission loss.

14. A computer readable medium that is tangible, comprising:
a computer program, wherein the computer program is configured to;
receive a desired substrate criterion of a desired substrate, wherein a component comprises the desired substrate and a desired coating, and wherein the desired coating comprises coating layers selected from at least one of a group of a primer, a basecoat, a clearcoat, a sealer, a surfacer, an adhesion promotor, a midcoat, and combinations thereof;
receive a desired coating criterion of the desired coating;
receive a coating criterion value, wherein the coating criterion value quantifies the desired coating criterion;
receive a plurality of known coating permittivities for the desired coating criterion at a plurality of different coating criteria values;
estimate a desired coating permittivity for the desired coating from the plurality of known coating permittivities measured at the plurality of different coating criteria values and with the coating criterion value;
produce an estimated component transmission loss of radar signal through the component;
determine if the estimated component transmission loss of radar signal is less than a maximum component transmission loss;
suggest a recommended criterion, wherein the recommended criterion reduces the estimated component transmission loss, and wherein the recommended criterion is selected from at least one of a group of a substrate thickness, a substrate material, a basecoat thickness, a basecoat pigment loading, a primer thickness, and a combination thereof; and
plot the estimated component transmission loss in a three-dimensional plot againstthe substrate criterion and the coating criterion.

15. The computer readable medium of claim 14, wherein:
the computer program comprises a mathematical model that relates a plurality of known coating permittivities to a plurality of different known criteria values for the desired coating criterion; and wherein
the computer program is configured to estimate the desired coating permittivity by entering the coating criterion value into the mathematical model.

16. The computer readable medium of claim 14, wherein:
the computer program is configured to suggest a desired substrate thickness that minimizes the estimated component transmission loss.

17. The computer readable medium of claim 14, wherein:
the computer program is further configured to produce a three-dimensional plot illustrating the estimated component transmission loss plotted against the desired coating criterion and the desired substrate criterion.

\* \* \* \* \*